United States Patent

Hedman

[11] 4,036,010
[45] July 19, 1977

[54] STUDDED CHAIN LINK
[75] Inventor: Bengt Hedman, Ljusne, Sweden
[73] Assignee: Bergvik och Ala Aktiebolag, Soderhamn, Sweden
[21] Appl. No.: 672,938
[22] Filed: Apr. 2, 1976
[30] Foreign Application Priority Data
   Apr. 10, 1975   Sweden ............................ 7504141
[51] Int. Cl.² ............................................ F16G 15/12
[52] U.S. Cl. ............................................ 59/84
[58] Field of Search .................. 59/84, 35, 78, 31, 33, 59/90

[56] References Cited
U.S. PATENT DOCUMENTS 1,256,117  2/1918  Duncan ................................. 59/35
2,302,263  11/1942  Schneck ................................ 59/35

FOREIGN PATENT DOCUMENTS 745,531  2/1933  France ................................. 59/35
1,213,039  10/1959  France ................................. 59/84
656,639  8/1951  United Kingdom ..................... 59/90

Primary Examiner—C.W. Lanham
Assistant Examiner—Gene P. Crosby
Attorney, Agent, or Firm—Pollock, VandeSande & Priddy

[57] ABSTRACT

A studded chain link wherein a stud is inserted between the sides of the link and fixed thereto only by pressing said sides of the link towards the opposed ends of the stud, the ends of said stud having concave configuration in two mutually perpendicular planes.

3 Claims, 3 Drawing Figures

FIG.1
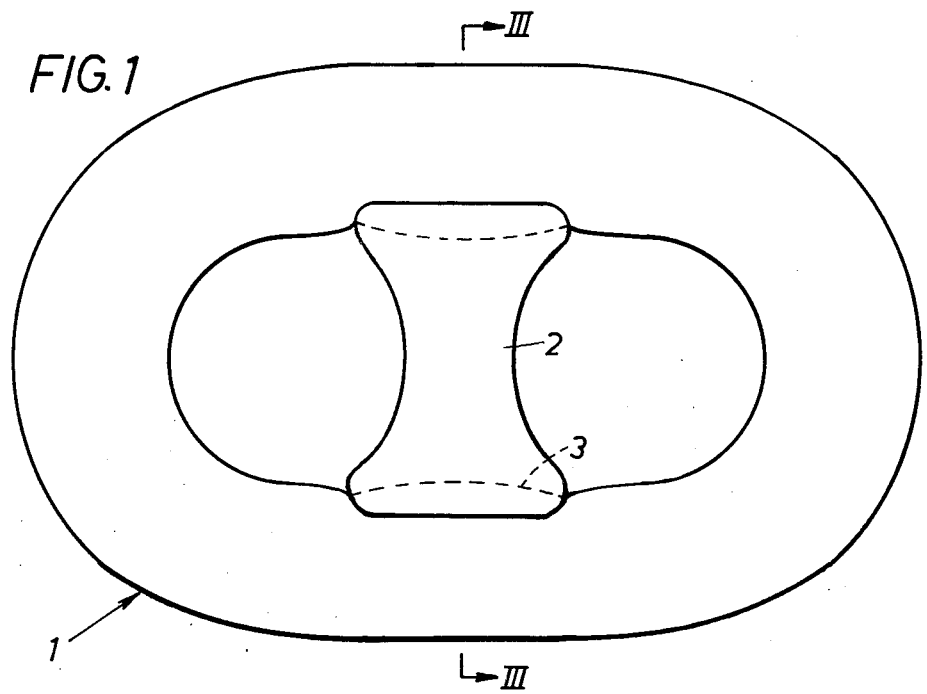
FIG.2 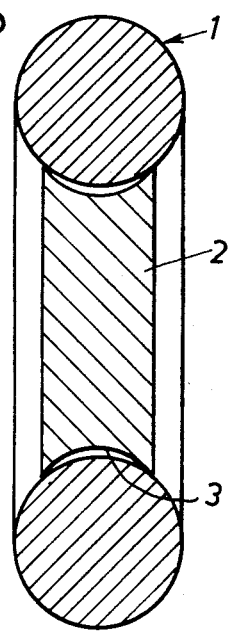 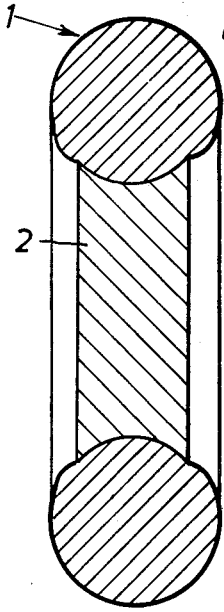 FIG.3

STUDDED CHAIN LINK

The present invention relates to a studded chain wherein a so called stud is inserted between the sides of each chain link and secured thereto only by pressing the sides of the links towards the ends of said stud, said ends having a concave configuration in a plane perpendicular to the longitudinal direction of the link.

Chains comprising such studded chain links are preferably used as anchor chains for ships, oil drilling rigs, loading bouys and the like, and very strict requirements are called for as to the strength of the chain. The links are made from cross-cut round steel blanks which are heated and bent into a hooked engagement with the finished chain. Then, the plain cutting surfaces of the steel blanks are joined in a flash welding machine, after which the stud is inserted just opposite to the joint and pressed into engagement with the sides of the link. The link is then heat-heated and proof-tested.

A previously known stud of the kind referred to hereinbefore is disclosed in the Swedish patent specification No. 168,492 (see also the journal "Ny Teknik", No. 8, 1975, p.1, 8 and 9). The ends of the stud are provided with wart-like protrusions adapted to facilitate the centering and fixing of the stud to the link. A support weld is applied around the end edges of the stud at the sides of the link thereby to further enhance the fixing of the stud and to prevent crevice corrosion, which is a requirement when the chain is to be used for anchoring oil drilling rigs for example. Since such a welding operation is to a great extent carried out manually, the total time for producing such link chains is increased. It has been found that the support weld in some instances gives rise to undesired weakening of the strength of the link.

The principle object of the present invention is to provide an improved studded chain link so constructed that the need for a support weld is eliminated. This object is achieved by making the ends of the stud smoothly concave, not only in a transverse plane of the link but also in a longitudinal plane of the link. By reason of this configuration of the stud ends, the stud will be firmly fixed to the sides of the link when the link sides in a heated condition are pressed toward one another ends against the stud. Preferably, the radius of curvature of the ends of the stud in the transverse plane is somewhat smaller than the radius of the chain link blank, to cause the stud ends to be forced into the material of the link sides during the pressing operation whereby a complete engagement is obtained between the stud and the link so that crevice corrosion is avoided without using a support weld.

Furthermore, by forming the end surfaces of the stud and the sides of the link comparatively long relative to the diameter of the link, minimum deformation of the link is obtained when the stud is pressed into the link, whereby the material is utilized in a more satisfactory manner as far as strength is concerned. Owing to this the joint of the link is also relieved from tensile and compressive stresses after the stud has been pressed into the link.

The accompanying drawing and the following description will further illustrate an embodiment of the present invention.

In the drawing:

FIG. 1 illustrates a studded chain link according to the present invention;

FIG. 2 is a cross sectional view of the link and illustrates a phase in the stud insertion operation where the sides of the link and the end edges of the stud have just come into engagement with each other; and FIG. 3 is a cross sectional view taken along the line III—III in FIG. 1 wherein the stud is pressed into the link.

In FIG. 1 a finished chain link 1 is shown having a stud 2 pressed into the sides of the link. The link 1 is produced from a round cross-section steel blank and is joined at one of its elongated sides just opposite to the tud 2 by flash welding. According to the invention the stud 2 has concave end surfaces 3 (see FIG. 1) in a longitudinal plane of the link 1 so as to firmly secure the stud 2 to the sides of the link. The ends of the stud are also concave in a transverse plane of the link as shown in FIG. 2. FIG. 2 illustrates a stage in the manufacturing operation where the sides of the link have been pressed toward one another to an extent such that they just come into engagement with the side edges of the stud 2. It should be noted that the radius of curvature of the end surfaces of the stud 2 in the transverse plane is smaller than the radius of the cross section of the chain link blank. Owing to the fact that the ends of the stud are concave in two mutually perpendicular planes, when the stud is fully pressed into the link to achieve the configuration shown in FIG. 3 a remarkably effective sealing or fitting is obtained between the stud 2 and the link 1 which favourably prevents creation of crevice corrosion. The ratio between the length of the engaging surface of the stud and the diameter of the link is about 1:0.75.

By thus forming the support surface at each end of the stud comparatively long relative to the diameter of the link, a reduced deformation of the link is obtained when the stud is pressed into the link (FIG. 3) and when the chain is heavily loaded with the result that the flash welded joint of the link does not receive any additional stresses. Thanks to the firm fixing of the stud and the good fitting of the contacting stud and link surfaces, the need for additional support welding is eliminated whereby the time required for manufacturing of the studded chain is shortened.

What we claim is:

1. A studded chain link comprising a stud which has been inserted between the elongated and round cross-sectional sides of a chain link blank and fixed thereto only by pressing the elongated sides of the link towards one another and towards the opposing ends of the inserted stud, the opposing ends of said stud which respectively engage the sides of said link each having a smoothly concave surface configuration in a transverse plane passing through said stud in a direction perpendicular to the direction of extension on the link sides, and said opposing ends of said stud also having a smoothly concave surface configuration which is entirely concave in a longitudinal plane passing through said stud in the direction of extension of the link sides.

2. A studded chain link as set forth in claim 1, wherein the radius of curvature of the concave ends of the stud in said transverse plane is smaller than the radius of the round cross-sectional sides of the chain link blank.

3. A studded chain link as set forth in claim 2, wherein the ratio between the length of the engaging surface at each end of the stud and the diameter of the link is about 1:0.75.

* * * * *